(12) United States Patent
Li et al.

(10) Patent No.: US 7,643,510 B2
(45) Date of Patent: Jan. 5, 2010

(54) METHOD, DATA INTERFACE AND DEVICE FOR TRANSPORTING DATA FROM HIGH-SPEED ETHERNET TO OPTICAL TRANSPORT NETWORK

(75) Inventors: Jianchang Li, Shenzhen (CN); Deliang Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 384 days.

(21) Appl. No.: 11/685,355

(22) Filed: Mar. 13, 2007

(65) Prior Publication Data

US 2007/0211750 A1    Sep. 13, 2007

(30) Foreign Application Priority Data

Mar. 13, 2006   (CN)   ............ 2006 1 0070828

(51) Int. Cl.
*H04J 3/22*      (2006.01)
(52) U.S. Cl. .............. 370/466; 370/469; 370/474
(58) Field of Classification Search ............... None
See application file for complete search history.

(56) References Cited

U.S. PATENT DOCUMENTS

| 6,829,247 | B1 * | 12/2004 | Corkum et al. ............ 370/465 |
|---|---|---|---|
| 6,996,123 | B1 * | 2/2006 | Jiang et al. ................ 370/465 |
| 7,187,650 | B2 * | 3/2007 | Xiong et al. .............. 370/235 |
| 7,512,150 | B2 * | 3/2009 | Walker et al. ............. 370/466 |
| 7,519,080 | B2 * | 4/2009 | Xiong et al. .............. 370/466 |
| 2004/0156390 | A1 | 8/2004 | Prasad et al. |
| 2004/0202198 | A1 | 10/2004 | Walker et al. |
| 2006/0233194 | A1 * | 10/2006 | Loprieno ................... 370/466 |
| 2007/0071033 | A1 * | 3/2007 | Surek et al. ............... 370/474 |
| 2008/0037984 | A1 * | 2/2008 | Perkins et al. .............. 398/43 |

FOREIGN PATENT DOCUMENTS

| CN | 2466852 | 2/2001 |
|---|---|---|
| CN | 1734986 | 2/2006 |

* cited by examiner

*Primary Examiner*—Chi H Pham
*Assistant Examiner*—Soon-Dong D Hyun
(74) *Attorney, Agent, or Firm*—Finnegan, Henderson, Farabow, Garrett & Dunner LLP

(57) ABSTRACT

The present invention provides a method, a data interface and a device for transporting data from a high-speed Ethernet to an OTN (Optical Transport Network), where seamless transport of Ethernet traffic to the OTN can be enabled through flow control, rate-matching, and mapping and encapsulation respectively performed at an Media Access Control Sub-layer, a Physical Coding Sub-layer, and an Optical Transport Network Interface Sub-layer. Thus, only one mapping and encapsulation of data is required to directly enable through a physical layer the transparent transport of the Ethernet traffic to the OTN, and due to the rate-matching implemented upon the mapping, the traffic transport can be enabled in a standard-compliant way with guaranteed efficiency and quality.

15 Claims, 5 Drawing Sheets

METHOD, DATA INTERFACE AND DEVICE FOR TRANSPORTING DATA FROM HIGH-SPEED ETHERNET TO OPTICAL TRANSPORT NETWORK

This application claims priority from Chinese Patent Application No. 200610070828.X, filed with the Chinese Patent Office on Mar. 13, 2006, entitled "METHOD, RELEVANT INTERFACE AND DEVICE FOR TRANSPORTING DATA FROM HIGH-SPEED ETHERNET TO OPTICAL TRANSPORT NETWORK", contents of which are incorporated herein by reference in its entirety.

FIELD OF THE INVENTION

The present invention relates to technologies of network data transport, and in particular to a method, a data interface and a device for transporting data from high-speed Ethernet to OTN (Optical Transport Network).

BACKGROUND OF THE INVENTION

The 802.3 Ethernet protocol has experienced a rapid advancement since born, and currently has become an undisputable actual standard within the LAN (Local Area Network) domain. Transport means for this protocol developed from the initial 10M (Megabit) with thick-cable bus to the 10Base2 with thin-cable, further to the 1Base5 and the 10Base-T with twisted-pair, still further to the 100Base-TX transported with Ethernet Category-5 line, the 100BaseT4 transported with Ethernet Category-3 line and the 100BaseFX transported with optical fiber, and subsequently to the Gigabit Ethernet including the 1000Base-SX transported with short-wavelength light, the 1000Base-LX transported with long-wavelength light and the 1000Base-T transported with Category-5 line. The IEEE (Institute of Electrical and Electronics Engineers) approved a standard for 802.3ae 10 Gbps Ethernet (10 GE) in 2002.

The 10 GE technology is a "high-speed" Ethernet technology, which is compatible with conventional Ethernet modes and takes advantage of the same MAC (Media Access Control) protocol, length-variable frame format and minimum and maximum frame lengths (a 64 to 1514-byte packet) as the conventional Ethernet modes. The operating rate defined by the 802.3ae for the MAC in the 10 GE is a standard one of 10 Gbps, and two forms of Physical Layer (PHY), LAN PHY and WAN (Wide Area Network) PHY can be used for transport. The LAN PHY provides a transport rate matching the 10 G MAC, and has a rated line rate for its operation of 10.3125 Gbps (i.e. a rate of 64B/66B-encoded 10 Gbps traffic data), and the WAN PHY provides a transport interface for seamless connection with the existing SDH (Synchronous Digital Hierarchy), and provides a traffic data transport rate of 9.58464 Gbps with the OC192C frame format.

With the continuous increase of demanded traffic transport bandwidths, applications of the OTN tend to be popular. It is an important issue how to transport the 10 GE traffic directly through the OTN with high quality and efficiency. There exists an inherent difference between line rates of the 10 GE and the OTN. As mentioned previously, the operating rate of the 10 G MAC is a standard one of 10 Gbps, and 10.3125 Gbps after being encoded through physical layer, and in the OTN, a payload of an OPU2 (Optical channel Payload Unit) is provided with a rated data rate of 9,995,276,963 bps (approximately referred to as 9.9953 Gb/s hereinafter for brevity), which consequently makes it difficult to enable the seamless transport of data between the networks.

At present, there are several solutions for mapping the 10 GE traffic to OTU2s (Optical channel Transport Units, generated from standard encapsulation of OPU2s in compliance with the ITU-T G.709 standard) in the OTN:

1. With the use of a 10 GE WAN interface, the 10 GE traffic is first processed into the OC192C frame format through the existing WIS (WAN Interface Sub-layer) in the WAN PHY, which is then mapped to OTU2s.

2. With the use of a 10 GE LAN interface, Ethernet packets are first converted into GFP packets with a flow control through the GFP (Generic Framing Procedure) with a flow control, which are then mapped to OTU2s.

3. An interface between the 10 GE-LAN and the SDH network, which is implemented through the GFP with a flow control, is further mapped to OTU2s.

4. With the use of a 10 GE LAN interface, Ethernet packets are first converted into GFP packets, through the GFP without a flow control, which are then mapped to OTU2s, where seven OPU2 OH (OverHead) bytes are needed.

5. With the use of a 10 GE LAN interface, the 10 GE traffic is directly mapped to OTU2s. Since the data rate of the 10 GE traffic is slightly higher, this solution needs to occupy partial FEC (Forward Error Correction) bytes of an OTU2, thus degrading the gain of the FEC.

6. With the use of a 10 GE LAN interface, the 10 GE traffic is directly mapped to extended OTU2s. This solution uses OTU2s with more than 4080 columns instead of standard OTU2 frames, and resulting in an outputting rate of 11.1 GHz for OTU signals, instead of a standard 10.7 GHz in the industry.

The solutions 1 through 4 described above each implement the mapping of the 10 G MAC packets to the OTU2 frames through two or more mapping procedures, which increases the complexity of devices in terms of their physical designs and relies upon a complex encapsulation technology for encapsulation of the 10 G MAC packets into intermediate data packets in compliance with a certain standard. The solutions 5 and 6 can directly enable through a PHY the transparent transport of the 10 GE traffic to the OTN, but have to either occupy a certain part of the FEC for transport of the 10 GE traffic or extend the OTU2 frames, thus resulting in a breach of the standard form of the OTU2 frames and in a significant obstacle to interfacing different chips. Moreover, the solution 5 has to employ a more complex enhanced FEC to ensure the coding gain of the FEC, and thus fails to simultaneously obtain both efficiency and transport quality, and the solution 6 is non-standardized, and thus can not be adapted smoothly to a future 40 Gbps transport circumstance, because some OTUs are in 10.7 GHz and others are in 11.1 GHz, so that numerous OTUs from different users can not be combined together through multiplexing them. Obviously from the above, the existing various processing methods have their respective disadvantages, and are prone to giving rise to an isolated network "island", which makes it difficult to interface networks and share information.

SUMMARY OF THE INVENTION

Embodiments of the present invention provide a method, a data interface and a device for transporting data from a high-speed Ethernet to an OTN (Optical Transport Network), with adaptation to data rate of the OTN and with guaranteed quality and efficiency of traffic transport.

In an aspect of the invention, there is provided a method for transporting data from a high-speed Ethernet to an OTN, which may include:

performing a flow control on Ethernet data units in such a way that the outputting rate of valid data in output data does not exceed the data rate of a payload in the OTN;

encoding the data units after the flow control, deleting invalid code between data units, and matching the rate of the output data to the data rate of the payload in the OTN; and mapping the rate-matched data into a data transport structure of the OTN, and encapsulating and transporting the data.

In another aspect of the invention, there is provided a data interface for connecting a high-speed Ethernet and an OTN, which may include an MACS (Media Access Control Sub-layer), a PCS (Physical Coding Sub-layer), an OTNIS (Optical Transport Network Interface Sub-layer) and a PMAS (Physical Medium Adaptation Sub-layer);

the MACS may be adapted to perform a flow control on Ethernet data units in such a way that the outputting rate of valid data in output data does not exceed the data rate of a payload in the OTN;

the PCS may be adapted to receive and encode the data units, on which the flow control has been performed through the MACS, to delete an invalid code between data units, and to match the rate of the output data to the data rate of the payload in the OTN;

the OTNIS may be adapted to receive the data rate-matched through the PCS, to map the data into a data transport structure of the OTN, and to encapsulate and transport the data to the PMAS; and the PMAS may be adapted to process, transmit and receive signals between the OTNIS and optical transport medium.

In still another aspect of the invention, there is provided a network device which may include a data interface for connection with a transport network, wherein the data interface may include the above data interface for connecting a high-speed Ethernet and an OTN.

The embodiments of the invention solve the problems of the plurality of mappings and the non-standard mapping format in the prior art through the procedures of flow control, rate-matching, and mapping and encapsulation. Only one mapping and encapsulation of data is required to enable the transparent transport of the high-speed Ethernet traffic to the OTN directly at the physical layer. Due to the rate-matching implemented upon the mapping, the traffic transport can be implemented in a standard-compliant way, thus efficiency and quality may be guaranteed.

Furthermore, the embodiments of the invention can be practiced independent of specific operating parameters of the network, and are applicable to mapping of current 10 GE traffic to the OTU2s as well as mapping of 40 GE traffic to OTU3s.

DETAILED DESCRIPTION OF THE INVENTION

Embodiments of the invention provide a method, a data interface and a device for transporting data from a high-speed Ethernet to an OTN, where procedures of flow control, rate matching, mapping and encapsulation, etc. are used to enable seamless transport of a high-speed Ethernet traffic to the OTN. The above procedures can be implemented respectively through an MAC sub-layer, a PCS (Physical Coding Sub-layer), an OTNIS (Optical Transport Network Interface Sub-layer), etc, and the exchange of signals with an optical transport medium can be implemented through a physical medium adaptation sub-layer.

Figure 1:
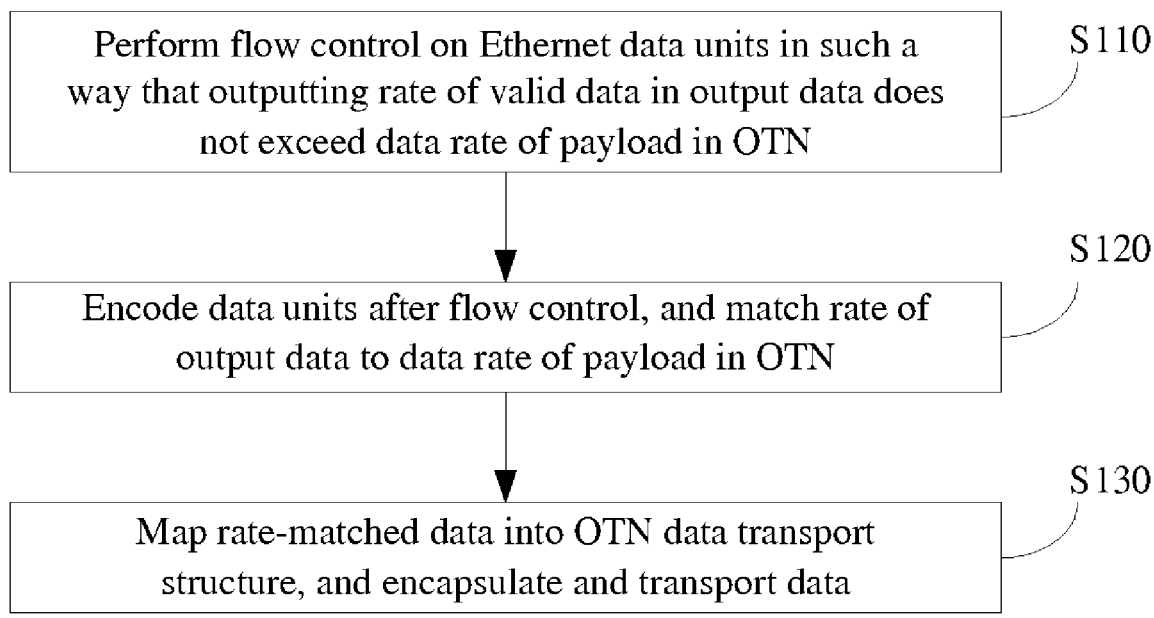
FIG. 1 is a flow chart of a method for transporting data according to an embodiment of the invention.

Referring to FIG. 1, an embodiment of the method for transporting data according to the invention includes the following steps.

In step S110, a flow control is performed on Ethernet data units in such a way that the outputting rate of valid data in output data does not exceed the data rate of a payload in the OTN.

In an embodiment of the invention, the flow control is performed through an IPG extending method, including the following steps.

1a) Determination is made from a packet length of a data unit whether the IPG after this data unit is sufficient that the outputting rate of valid data in output data does not exceed the data rate of payload in an OTN.

Since a data unit is usually encoded (e.g. 4B/5B-encoded, 8B/10B-encoded, 64B/66B-encoded, etc.) prior to entering a transport channel, the output data refers to the encoded data, and the output rate of the valid data shall take into account a gain resulted from the encoding. Furthermore, an undeletable invalid code of a certain length is typically disposed behind the data unit according to the requirements of the operation of system, thus the valid data shall include the data unit and the undeletable invalid code set in accordance with the requirements of the system. Additionally, in a practical network, dithering of the system clock within a certain range should be allowed, and in a most strict case, it should be guaranteed that a minimum IPG length $L_{rldlemin}$ required for the flow control satisfies the following two equations:

$$[(L_{eth}+L_{udldle})/(L_{eth}+L_{udldle}+L_{dldle})] \times (v_e \times P_v + v_1) = v_o - v_2$$

$$L_{rldlemin} = L_{udldle} + L_{dldle}$$

Where $L_{eth}$ is the packet length of a current data unit, $L_{udldl}$ is the length of an undeletable invalid code set according to system requirements, $L_{dldle}$ is the length of a deletable invalid code, $v_e$ is the transport rate of data units after flow control, $P_v$ is the encoding gain of encoding a data unit after flow control, $v_o$ is the data rate of a payload in the OTN, $v_1$ is the dithering range of an Ethernet traffic clock, and $v_2$ is the dithering range of an OTN traffic clock.

1b) In the case that the actual IPG length of the Ethernet data unit satisfies the above requirements of a minimum IPG length necessary for the flow control, a subsequent processing can be performed directly, otherwise the subsequent processing shall follow a corresponding extension of IPG.

There are various methods for extending IPG, including but not limited to an extending method with a length-fixed trail, a proportion extending method, a statistic extending method, etc. Regardless of any calculation method used with an additional IPG, a tradeoff between a minimum IPG and a maximum utilization of bandwidths shall be satisfied. An embodiment of the invention employs the following proportion graded-IPG extending method:

$$L_{exIdle} = \{Int[(L_{rIdlemin} - L_{inIdle})/n] + 1\} \times n$$

Where Int represents an integerizing operation, $L_{exIdle}$ is an IPG length to be extended, $L_{inIdle}$ is an actual IPG length, and n is a preset number of bytes included per grade.

The above proportion-grading extending method is advantageous in that the IPG length occurs in a form of n, 2n, 3n ..., and an IPG interposal can be performed with modularity. Thus, the system can be simplified in complexity, and the configuration of n can be selected appropriately in accordance with the bit width of the processing system, typically 1 to 8 bytes is an appropriate selection.

In step S120, the data units are encoded after the flow control, and with deletion of the invalid code between data units, the rate of the output data is matched to the data rate of a payload in the OTN.

The encoding method used in step S120 corresponds to that used for setting the encoding gain in step S110, and the deleted invalid code is the $L_{dIdle}$ described in step S110. The rate adaptation can be performed correctly provided that the requirements of the flow control are satisfied in step S110 with sufficient $L_{dIdle}$ provided for deletion.

In step S130, the rate-matched data is mapped into a data transport structure of the OTN, and then encapsulated and transported.

For a standardized data transport, the mapping of data can comply with a specification of OTN data structure as defined in the ITU-T G.709 standard. Naturally, those skilled in the art will appreciate that the invention can also be applied even if such a specification is modified, that is, the mapping of data can be implemented in compliance with the modified specification of OTN data structure.

Figure 2:
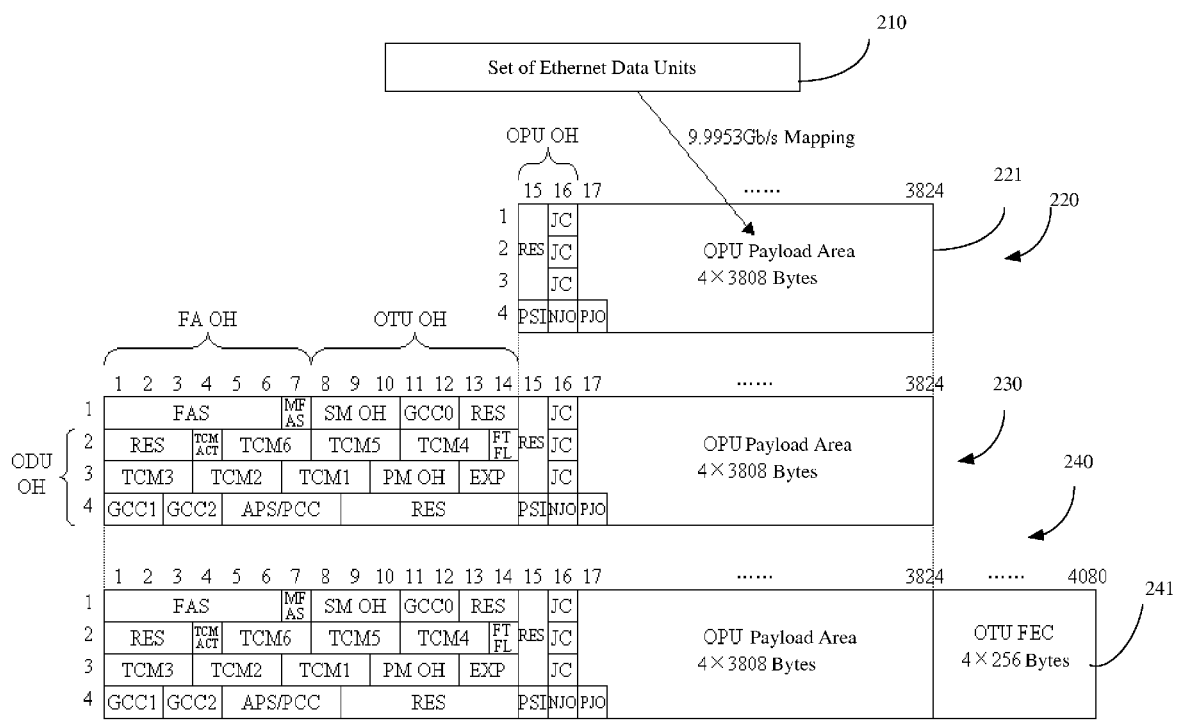
FIG. 2 is a schematic diagram of a data encapsulation structure for mapping an Ethernet packet to an OTU2 frame according to an embodiment of the invention.

Hereinafter, a procedure of mapping Ethernet data to an OTU2 will be described as an example, and a schematic diagram of a corresponding data encapsulation structure is illustrated in FIG. 2, where RES represents reserved bytes (see the ITU-T G.709 standard for details on the data encapsulation structure and definition thereof as well as the extension based on a basic frame structure, e.g. virtual concatenation of OPUs and multiplexing of ODUs, which will not be described here).

3a) The rate-matched Ethernet data 210 is mapped the payload area 221 of the optical channel payload unit, and an actual OPU2 220 is generated after fixedly filling OPU OH. The OPU OH includes one PSI (Payload Structure Identifier) byte, three JC (Justification Control) bytes and one NJO (Negative Justification Opportunity) byte. Additionally, a PJO (Positive Justification Opportunity) byte is filled in the payload area 221.

As defined in the ITU-T G.709 standard, the PSI indicates an area of 256-bytes, in which the first byte PSI[0] indicates a PT (Payload Type), and the rest bytes include OHs relevant to concatenation and user signal mapping. Since the ITU-T G.709 standard has no definition of a PT code for the payload type of Ethernet data, an embodiment of the invention defines the PT byte as 2A (00101010) (2A is hexadecimal, and 00101010 is binary) (For the specific rule of mapping the Ethernet data unit to the OPU2 payload, reference may be made to the "Transmission order" in the ITU-T G.709 standard, "From left to right, and from up to down").

3b) Addition of an ODU OH (Optical channel Data Unit OH), an FA OH (Frame Alignment) and an OTU OH to the OPU2 220 results in an ODU (Optical channel Data Unit) 230.

The ODU OH includes:
GCC-1 and GCC-2 (ODUk General Communication Channels);
APS/PCC (ODUk Automatic Protection Switching and Protection Communication Channel);
PM OH (Path Monitoring OH), including one-byte TTI (Trail Trace Identifier), one-byte BIP-8 (Bit Interleaved Parity-8), one-byte BEI (Backward Error Indication) and BDI (Backward Defect Indication), etc.;
TCM1~6 OH (Tandem Connection Monitoring OH), substantially identical to the PM OH, including one-byte TTI and one-byte BIP-8, except that the other one byte includes BIAE (Backward Incoming Alignment Error) besides BEI and BDI;
TCM ACT (TCM Activiation/Deactivation);
FTFL (Fault Type and Fault Location), including a multi-frame OH byte and indicating a 256-byte information area about failure type and failure location; and
EXP (Experimental OH).
The OTU OH includes:
SM OH (Section Monitoring OH), with a structure identical to that of the TCM OH; and
GCC0 (OTUk General Communication Channel 0)
The FA OH includes FAS (Frame Alignment Signalling) and MFAS (Multi-Frame Alignment Signal), where the FAS is a six-byte fixed code field indicative of a start of a data frame.

3c) An error correction code 241 is calculated and added to generate an OTU2 240, where the calculation is performed through the FEC, and the error correction code added to the end of ODU includes 4 rows and 256 columns, totally 1024 bytes.

3d) The OTU2 except the FAS is scrambled, for instance, using a polynomial $1+x+x^3+x^{12}+x^{16}$ in accordance with the ITU-T G.709 standard, and the scrambled digital signal is transported.

Figure 3:
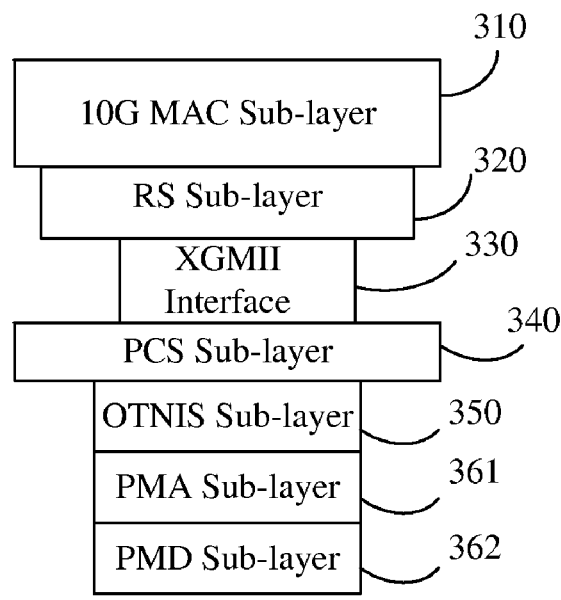
FIG. 3 is a schematic diagram of a network architecture in an embodiment of a data interface according to the invention.

Referring to FIG. 3, an embodiment of an inventive interface for connecting the 10 G Ethernet and the OTN includes a 10 G MAC 310, an RS (Reconciliation Sub-layer) 320, a 10 Gb/s XGMII (10 Gigabit Media Independent Interface) 330, a PCS 340, an OTNIS 350, and a physical medium adaptation sub-layer consisted of a PMA (Physical Medium Attachment) sub-layer 361 and a PMD (Physical Medium Dependent) sub-layer 362.

Figure 4:
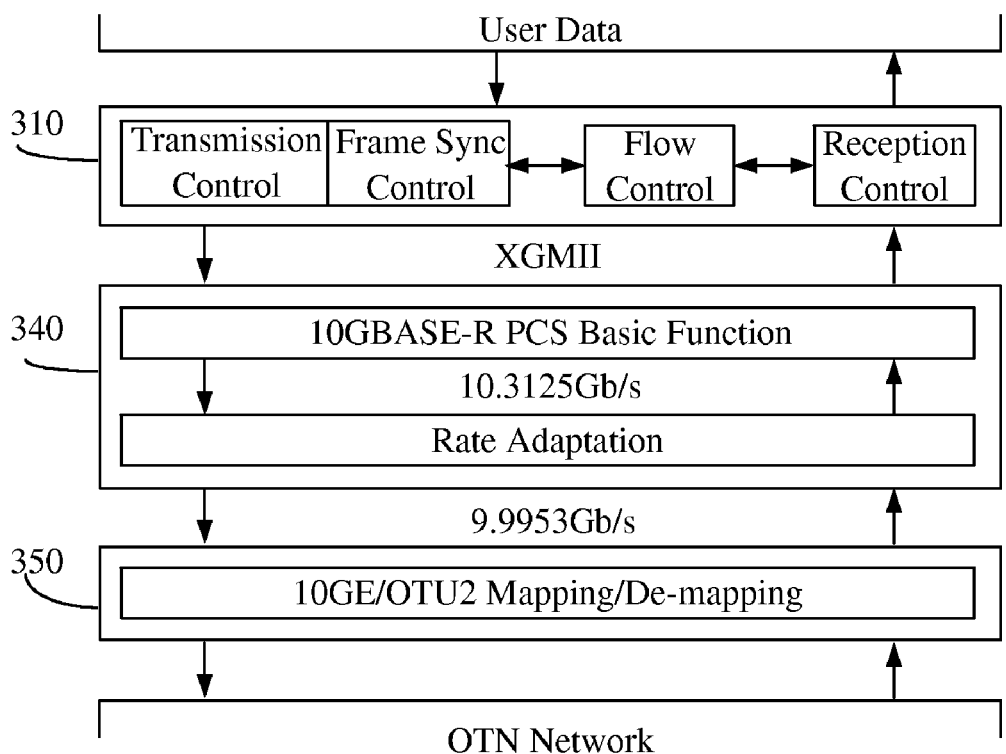
FIG. 4 is a schematic diagram of data flow via the data interface illustrated in FIG. 3.
Figure 5:
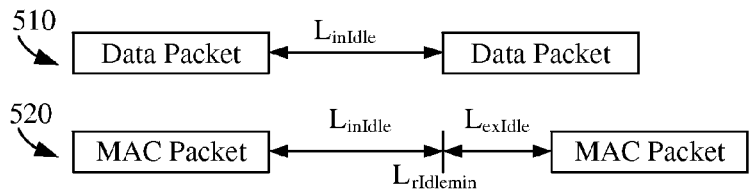
FIG. 5 is a schematic diagram of extending IPG (Inter-Packet Gap) at the MAC sub-layer illustrated in FIG. 3.

Together referring to FIG. 4, in addition to standard MAC function, the 10 MAC 310 also performs a flow control on the Ethernet data units, i.e. IPG calculation and interposal. As illustrated in FIG. 5, an input Ethernet data unit (data frame) 510 is IPG-extended, and then a data unit (MAC frame) 520 after flow control is output, that is, an additional IPG $L_{exIdle}$ length is added to an inherit IPG length $L_{inIdle}$ in order to satisfy the requirement of a minimum IPG length $L_{rIdlemin}$ (see step S110 of the embodiment of the inventive transporting method for details).

In this embodiment of the invention, as defined in the 10 GE standard, the MAC layer 310 operates at a standard rate of 10 Gb/s, and hence the data unit after the flow control is at a transport rate of 10 Gb/s, and connected to the PCS 340 via the XGMII 330. The PCS 340 performs 64B/66B encoding, so that the encoding gain of the output data is 66/64. The dithering range of a 10 GE traffic clock is within 100 ppm, and the guideline for the dithering of the OTN traffic is 20 ppm. In accordance with /S code aligning method of the RS 320, an undeletable IPG length $L_{udldle}$ ranges from 4 to 7 bytes dependent upon Ethernet packet length, where the $L_{udldle}$ takes 7 bytes for the worst case. A necessary minimum IPG length $L_{rldlemin}$ can be calculated by following equations:

$$[(L_{eth}+7\ b)/(L_{eth}+7\ b+L_{dldle})]\times(10\times66/64+100\ \text{ppm})$$
$$\text{Gb/s}=(9.9953-20\ \text{ppm})\text{Gb/s}$$

$$L_{rldlemin}=7\ b+L_{dldle}$$

Thus in the case that the actual IPG length is smaller than the necessary minimum IPG length, an IPG length $L_{exldle}$ to be extended can be obtained through the proportion-grading extending method.

The RS 320 and the XGMII 330 are located between the MAC sub-layer 310 and the PCS 340. The RS 320 performs mapping of path data and relevant control signals between the MAC sub-layer 310 and the XGMII 330, and the XGMII 330 provides a logic interface of 10 Gb/s between the MAC sub-layer 310 and the physical layer. The XGMII 330 and the RS 320 enable the MAC sub-layer 310 to be connected to different type of physical medium.

In addition to functioning as a standard 10 GBASE-R PCS, the PCS 340 performs rate-matching between the MAC sub-layer 310 and the OTNIS 350, which corresponds to step S120 of the transporting method described above. According to an embodiment of the invention, in transport direction, the 10 GE MAC after the flow control is received and then 64 B/66 B-encoded, and with the deletion of the invalid code, the rate of the output data, 10.3125 Gb/s, is matched to that of a payload in the OTN, 9.9953 Gb/s; and in reception direction, the above procedure is performed reversely, that is, with interposal of an Idle code, the rate of a standard bandwidth of an OTU2 payload de-mapped from the OTNIS 350 is adapted to that of a standard bandwidth of the 10 GE traffic, 10.3125 Gbit/s.

Figure 6:
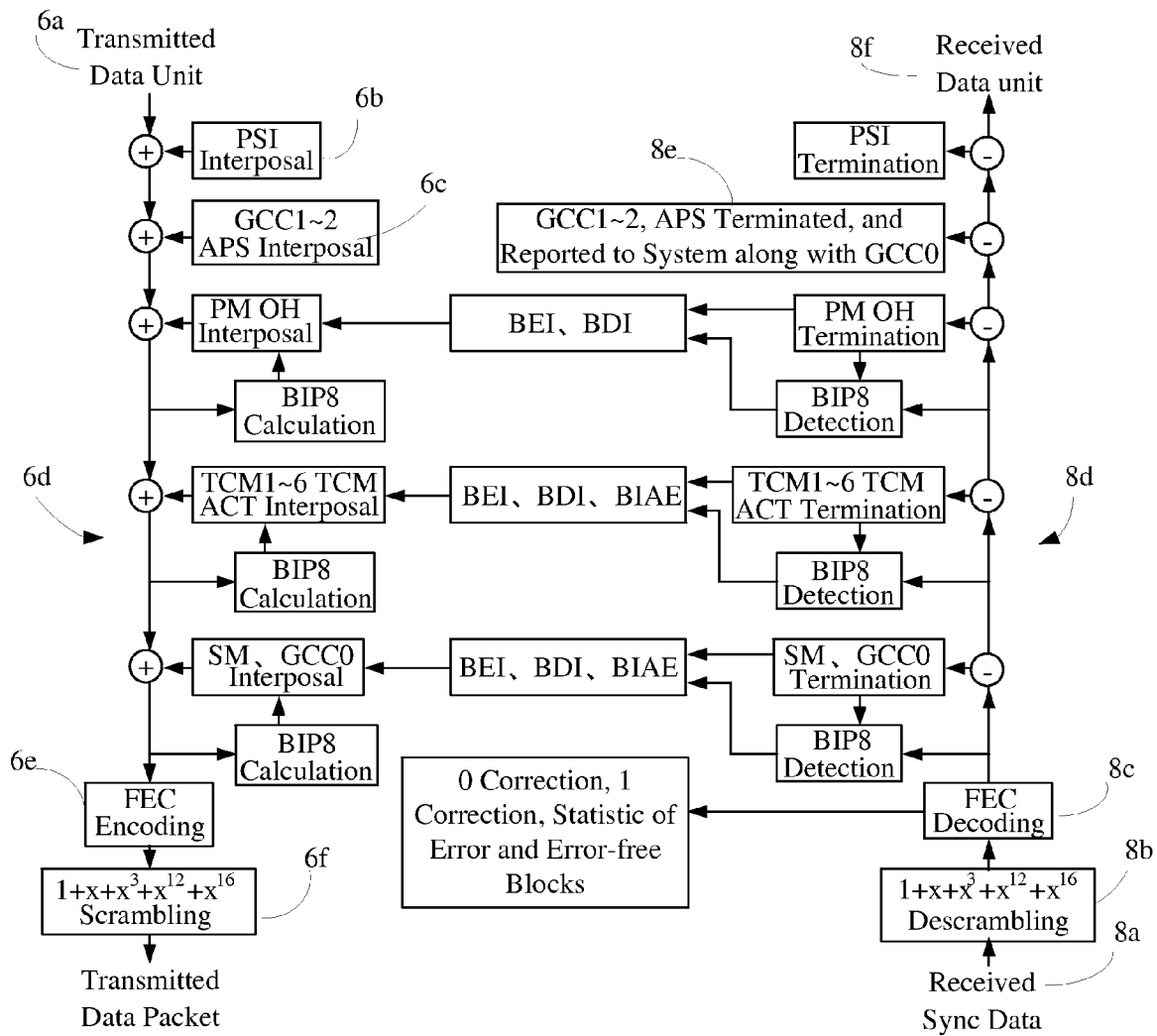
FIG. 6 is a schematic diagram of data processing flow at the OTNIS sub-layer illustrated in FIG. 3.

The OTNIS 350 performs operations of mapping and de-mapping data in Ethernet frame to OUT, which corresponding to step S130 of the transporting method described above. According to an embodiment of the invention, the operations of mapping and de-mapping data in Ethernet frame of 9.9953 Gb/s to OUT2 are performed. A flow chart of data processing at OTNIS 350 is illustrated in FIG. 6, where "+" indicates interposal of an OH, and "−" indicates termination of an OH (Only a primary data processing procedure is illustrated in FIG. 6, and see the ITU-T G.709 standard for details of parameter configurations and calculation method). The followings are involved in the transport direction:

6a. A set of data units are received from PCS, and mapped to OTU2 payload;

6b. OPU OHs, such as PSI, are interposed, and fixedly filled to generate an actual OPU2;

6c. ODU OHs are interposed including GCC-1, GCC-2, APS, PM OH (simultaneously with a corresponding BIP8 calculation), TCM1~6 (simultaneously with a corresponding BIP8 calculation), TCM ACT, etc.;

6d. OTU OHs, such as SM (simultaneously with a corresponding BIP8 calculation), GCC0, etc., are interposed, and a frame head FAS is added;

6e. FEC is calculated and added to form an OTNIS frame (OTU2);

6f. The OTNIS frame except the FAS is scrambled using the polynomial $1+x+x^3+x^{12}+x^{16}$.

The followings are involved in the reception direction:

8a. Data is received from the PMA, the starting location of the frame is determined in accordance with the FAS, locating 8-bit group boundary and frame boundary of unaligned data flow;

8b. The received frame except the FAS is descrambled;

8c. The received frame is FEC-decoded;

8d. In an order reverse to the transport procedure, the respective OHs are detected and terminated sequentially, and the actual 10 GE payload is extracted;

8e. Errors and abnormalities occurring in the above procedure are reported to an administration layer of the system, e.g. error-correction information in the FEC decoding and a statistic of errors, errors and abnormality information in each BIP8 detection and in parameters such as BEI, BDI, BIAE, etc.

8f. The abstracted 10 GE payload is de-mapped to a set of data units, which are in turn transported to the PCS.

It shall be noted that the BIP8 calculation in FIG. 6 can vary and be performed different times dependent upon user or system requirements.

The PMA sub-layer 361 and the PMD sub-layer 362 constitute the physical medium adaptation sub-layer, a standard physical access layer as defined in the 802.3ae. The PMA sub-layer 361 provides a serialized service interface between an upper layer and the PMD sub-layer 362, which serializes data from the upper layer or de-serializes serial signals from the PMD sub-layer 362, and the PMD sub-layer 362 is responsible for exchanging serialized symbol code bits between the PMA sub-layer 361 and a medium so as to exchange serialized photoelectric signals. The PMD sub-layer 362 converts the electric signals into a form suitable for transport through a certain medium, such as various standard optical fibers.

Figure 7:
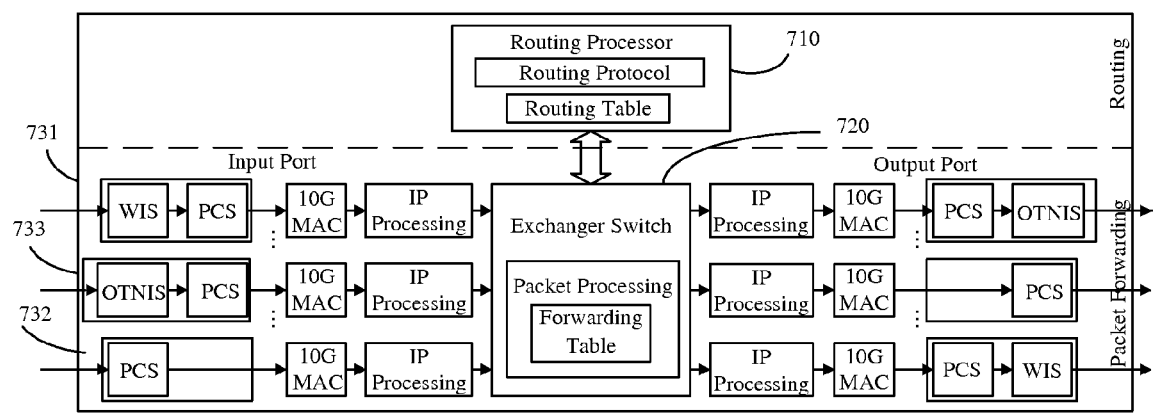
FIG. 7 is a schematic diagram of a router provided with the data interface according to an embodiment of the invention.

The data interface for connecting the high-speed Ethernet and the OTN according to the embodiments of the invention can be widely applied to various network devices, such as a switch, an exchanger, etc., connecting the 10 GE LAN and the OTN. By example of a router, an application of the inventive data interface to a network device will be described hereinafter. The router as illustrated in FIG. 7 includes a router processor 710, an exchanger switch 720, input ports 730 and output ports 740. The router processor 710 is responsible for selective control, performance monitoring, status reporting, etc., for the whole routing protocol. The exchanger switch 720 is a packet-crossed matrix based upon processing at a network layer, and its input ports 730 are divided into three kinds of ports: the first kind of ports 731 use SDH frames of the 10 G MAC traffic to extract the 10 MAC through the WIS; the second kind of ports 732 extract the 10 G MAC directly from the 10 G LAN; and with the use of the inventive data interface, the third kind of ports 733 use OTU2 frames of the 10 G MAC traffic to extract the 10 G MAC through the OTNIS. IP processing modules of respective ports are primarily adapted to monitor and make a statistics of IP performances of a data flow. Alike, the output ports are provided with three traffic forms of OTN frames, SDH frames and 10 G LAN. In this way, the router can be applied to put the 10 G MAC data into different networks for transport.

The embodiments of the invention solve the problems of a plurality of mappings and a non-standard mapping format in the prior art through the procedures of flow control, rate-matching, and mapping and encapsulation. Only one mapping and encapsulation of data is required to directly enable through the physical layer the transparent transport of the Ethernet traffic to the OTN. Due to the rate-matching implemented upon the mapping, the traffic transport can be enabled in a standard-compliant way with guaranteed efficiency and quality. Furthermore, the embodiments of the invention can be commonly applied to the seamless transport from the high-speed Ethernet to the OTN, applicable to both mapping of current 10 GE traffic to OTU2s and mapping of 40 GE traffic to OTU3s.

What is claimed is:

1. A method for transporting data from a high-speed Ethernet to an OTN (Optical Transport Network), comprising:

performing a flow control on Ethernet data units in such a way that an outputting rate of valid data in output data does not exceed a data rate of a payload in the OTN;

encoding the data units after performing the flow control, deleting invalid code between the data units, and matching the rate of the output data to the data rate of the payload in the OTN; and mapping the rate-matched data into a data transport structure of the OTN, and encapsulating and transporting the data.

2. The method for transporting data from a high-speed Ethernet to an OTN according to claim 1, wherein the performing of a flow control on Ethernet data units comprises:

extending IPG (Inter-Packet Gap) behind the data unit when the outputting rate of valid data in output data exceeds the data rate of payload in an OTN.

3. The method for transporting data from a high-speed Ethernet to an OTN according to claim 2, wherein the extending of IPG is performed using a proportion-grading extending method, comprising:

obtaining an IPG length to be extended $L_{exIdle}$ according to:

$$L_{exIdle} = \{Int[(L_{rIdlemin} - L_{inIdle})/n] + 1\} \times n$$

wherein Int represents an integerizing operation, $L_{rIdlemin}$ is a minimum IPG length necessary for the flow control, $L_{inIdle}$ is an actual IPG length, and n is a preset number of bytes included per grade.

4. The method for transporting data from a high-speed Ethernet to an OTN according to claim 3, wherein the minimum IPG length necessary for the flow control $L_{rIdlemin}$ is obtained according to:

$$[(L_{eth} + L_{udIdle})/(L_{eth} + L_{udIdle} + L_{dIdle})] \times (v_e \times P_v + v_1) = v_o - v_2$$

$$L_{rIdlemin} = L_{udIdle} + L_{dIdle}$$

wherein $L_{eth}$ is a packet length of a current data unit, $L_{udIdl}$ is a length of an undeletable invalid code set according to system requirements, $L_{dIdle}$ is a length of a deletable invalid code, $v_e$ is a transport rate of data units after flow control, $P_v$ is an encoding gain of encoding a data unit after flow control, $v_o$ is the data rate of a payload in the OTN, $v_1$ is a dithering range of an Ethernet traffic clock, and $v_2$ is a dithering range of an OTN traffic clock.

5. The method for transporting data from a high-speed Ethernet to an OTN according to claim 4, wherein the deleting of the invalid code between the data units comprises deleting the invalid code corresponding to the length of a deletable invalid code $L_{dIdle}$.

6. The method for transporting data from a high-speed Ethernet to an OTN according to claim 2, wherein the extending of IPG is performed using one of length-fixed trail method, proportion extending method and statistic extending method.

7. The method for transporting data from a high-speed Ethernet to an OTN according to claim 1, wherein the mapping of the rate-matched data into a data transport structure of the OTN and the encapsulating and transporting of the data comprises:

mapping the rate-matched data unit to a payload area of an OPU2 (Optical channel Payload Unit), adding a payload structure identifier overhead and overheads relevant to signal mapping and concatenation, and generating the actual OPU2;

adding an overhead of the data unit to the OPU2 and generating an ODU (Optical channel Data Unit), and adding a frame alignment overhead and a transport overhead thereto;

calculating and adding an error-correction code of the ODU, and generating an OTU (Optical channel Transport Unit); and scrambling and transporting the OTU.

8. The method for transporting data from a high-speed Ethernet to an OTN according to claim 7, wherein the scrambling of the OTU is performed using a polynomial.

9. A network device comprising a data interface for connection with a transport network, wherein the data interface comprises:

an MACS (Media Access Control Sub-layer) operating on the network device, for performing a flow control on Ethernet data units in such a way that the outputting rate of valid data in output data does not exceed the data rate of a payload in the OTN;

a PCS (Physical Coding Sub-layer) operating on the network device, for receiving and encoding the data units, on which the flow control has been performed through the MACS, deleting an invalid code between data units, and matching the rate of the output data to the data rate of the payload in the OTN;

an OTNIS (Optical Transport Network Interface Sub-layer) operating on the network device, for receiving the rate-matched data through the PCS, mapping the data into a data transport structure of the OTN, and encapsulating and transporting the data to the PMAS; and a PMAS (Physical Medium Adaptation Sub-layer) operating on the network device, for processing, receiving and transmitting signals between the OTNIS and an optical transport medium.

10. The network device according to claim 9, wherein the data interface further comprises:

an RS (Reconciliation Sub-layer) located between the MACS and the PCS, for performing mapping of path data and relevant control signals between the MACS and a Media Independent Interface (MII) located between the MACS and the PCS in such a way that the MACS can be connected with the PCS via the MII.

11. The network device according to claim 9, wherein the PMAS comprises:

a PMA (Physical Medium Attachment) sub-layer, for serializing and de-serializing data from the OTNIS to the PMD sub-layer; and a PMD (Physical Medium Dependent) sub-layer, for exchanging serialized photoelectric signals between the PMA sub-layer and an actual optical transport medium.

12. The network device according to claim 9, wherein the network device is a router or an exchanger.

13. The network device according to claim 10, wherein the network device is a router or an exchanger.

14. The method for transporting data from a high-speed Ethernet to an OTN according to claim 3, wherein the mapping of the rate-matched data into a data transport structure of the OTN and the encapsulating and transporting of the data comprises:

mapping the rate-matched data unit to a payload area of an OPU2 (Optical channel Payload Unit), adding a payload structure identifier overhead and overheads relevant to signal mapping and concatenation, and generating the actual OPU2;

adding an overhead of the data unit to the OPU2 and generating an ODU (Optical channel Data Unit), and adding a frame alignment overhead and a transport overhead thereto;

calculating and adding an error-correction code of the ODU, and generating an OTU (Optical channel Transport Unit); and scrambling and transporting the OTU.

15. The method for transporting data from a high-speed Ethernet to an OTN according to claim 4, wherein the mapping of the rate-matched data into a data transport structure of the OTN and the encapsulating and transporting of the data comprises:

mapping the rate-matched data unit to a payload area of an OPU2 (Optical channel Payload Unit), adding a payload structure identifier overhead and overheads relevant to signal mapping and concatenation, and generating the actual OPU2;

adding an overhead of the data unit to the OPU2 and generating an ODU (Optical channel Data Unit), and adding a frame alignment overhead and a transport overhead thereto;

calculating and adding an error-correction code of the ODU, and generating an OTU (Optical channel Transport Unit); and scrambling and transporting the OTU.

* * * * *